3,761,227
METHOD FOR DETECTION OF OPIUM
DERIVATIVES IN URINE
Herbert M. Conrad, Pacific Palisades, and Hilary Ashe, Los Angeles, Calif., assignors to Conrad Laboratories, Inc.
No Drawing. Filed Apr. 24, 1972, Ser. No. 247,008
Int. Cl. G01n 21/06, 33/16
U.S. Cl. 23—230 B        7 Claims

ABSTRACT OF THE DISCLOSURE

Method for detecting morphine in a urine sample which includes adjusting the pH of the urine to 8.5–9.5, extracting the morphine into a chloroform-isopropyl alcohol solution and separating the extraction phase from the aqueous phase by means of phase separation paper. The extraction phase, if morphine is present, will develop a pink color when an indicator of ammonium molybdate in concentrated sulfuric acid is added thereto.

BACKGROUND OF THE INVENTION

(1) Field of the invention

This invention relates to a method for the rapid determination of the concentration of morphine in urine, which arises from the metabolism of opium derivatives, such as heroin, morphine, or codeine, and more particularly, to a novel and improved method of detection which can be adapted to be performed with the use of a self-contained kit in field use.

The need for detection of opium derivatives has increased substantially in recent years. The incidence of use of these drugs has increased very substantially in the general population, generating many and severe social, medical and legal problems. The illicit use of these drugs also poses an enormous problem to the Armed Forces. Penal institutions and law enforcement agencies require the availability of procedures for determining concentrations of these drugs, and physicians, hospitals, drug treatment centers and methadone clinics, among many others, require rapid determination of drug concentrations.

(2) Description of the prior art

The identification of drug users is at present normally based upon the detection and measurement of the concentration of morphine and/or morphine conjugates in the urine of the suspected individual. Many procedures have been developed which yield more or less accurate measurements. These procedures include thin layer chromatography, gas chromatography and isotope dilution, as well as other techniques which have been developed for laboratory use.

These determinations are time consuming and they require skilled technicians with an elaborate laboratory facility. Further, transporation of samples from the collection site to the analysis site, with the resulting complications in accurate record keeping, pose additional problems.

Many books and articles have been published presenting the chemistry of the various known procedures for detecting the drugs and detailing the procedures themselves. Analysis of the accuracies which can be attained and other details are also presented. Among these references is Methods of Forensic Sciences, edited by A. S. Curry (1964), which presents, on pages 142–145, a review of the subject. An article by D. J. Barry, J. Grove and B. Widdop along with J. H. P. Willis, which appears on pages 31–37 of the Bulletin on Narcotics, vol. XXII, No. 3, July–September 1970, is still another view of the subject. A still further listing of well known techniques is found on pages 18–23 of the journal of Psychopharmacology Bulletin, vol. 3, #3, July 1966.

From the various techniques which have been developed, the indicator-dye method was chosen as presenting an opportunity to develop a method for detection of opium derivatives in urine which could be adapted to provide a field test of sufficient accuracy for many purposes. The indicator-dye method is based on the fact that many organic bases react with colored organic acids to form addition complexes which are soluble in organic solvents and which provide color changes which can be measured photometrically. Thus, by election of a suitable indicator, a visual indication of the existence of opium derivatives can be provided. There are three basic steps in the process of drug identification using this technique.

The first step in the process is that of pH adjustment. This step is necessary since morphine can only be extracted from urine with organic solvents when the pH of the urine is maintained between 8.5 and 9.5, whereas the pH of the unadjusted urine sample lies in the range of 4.7 to 8.0 (average 6.0).

The second step is the separation of the morphine from the urine. This is achieved by the addition of a solvent which extracts the morphine from the urine. The solvent containing the morphine is then separated from the urine.

The third step is the identification process in which the morphine dissolved in the solvent is detected and indicated visually.

SUMMARY OF THE INVENTION

The present invention comprises a specific adaptation of the indicator-dye procedure in which this procedure is adapted to be performed by a relatively simple kit which makes it possible to perform the test anywhere with minimally trained personnel. The test, as adapted, does not require water, electricity or laboratory equipment of any kind and thus the kit may be completely self-contained. The procedure can be performed relatively quickly (approximately three minutes), compared with prior art procedures which require several hours at least, and which generally can only be completed in a twenty-four hour period. The test kit is extremely simple and inexpensive and provides a sensitivity of approximately one-half microgram per milliliter. This sensitivity is sufficient to detect the presence of a normal dose absorbed by an addict within a period of twenty-four hours after the dose has been administered.

Although the procedure, as performed with the kit, has some disadvantages, principally that of limited specificity and sensitivity, it provides a practical, useful, inexpensive and rapid determination of great value to the agencies listed above. It is also possible, if certain compounds such as tetracycline are present in the urine to get color reactions due to these compounds. The color from these compounds may give a false positive or obscure the color developed by morphine, however, the test provides negative findings of great reliability.

Briefly described, the present invention is a method for detection of opium derivatives which has been adapted to be performed by a simple kit which enables performance of the three steps necessary in the Indicator-dye process to yield an indication of the presence of morphine by the development of a distinctive, pink color at the conclusion of the procedure. The intensity of the color is proportional to the concentration of morphine in the urine under test, although the color fades with time on standing.

It is an object of the present invention to provide a novel and improved method for the detection of opium derivatives in urine, which procedure is relatively simple and inexpensive.

Another object of the present invention is to provide a novel and improved method for the detection of opium derivatives in urine which can be performed in the field, which can be adapted to be performed by a relatively simple kit which is completely self-contained, and which requires neither water, electricity nor laboratory equipment of any kind.

A still further object of the invention is to provide a novel and improved method for the detection of opium derivatives in urine which yields relatively high sensitivity while retaining the advantages set forth above.

Other objects and advantages of the method, which is the subject of the present invention and of the kit which has been developed to enable simple and rapid performance of the method, will become apparent from the detailed description of the present invention which follows.

DETAILED DESCRIPTION OF INVENTION

As has been set forth above, the first step in the process is pH adjustment. The pH enabling the extraction of morphine must be brought within range 8.5 to 9.5 pH units. The pH is adjusted according to the present invention by adding measured amounts of sodium borate (approximately 0.8 grams) and sodium carbonate (approximately 0.15 grams) to the urine specimen. Other buffers, inorganic and organic can be used for pH correction, but the use of the particular combination of buffers specified has yielded a relatively high pH (9.3), a more alkaline solution which is preferred in the present process.

Although sodium borate has been used alone in the prior art, the sodium carbonate has been added to provide more precise pH control. The salts to which the urine specimen is added also contain a measured quantity of sodium sulfate (0.8 grams) which serves as an extraction aid in the second or extraction step. Further, the volume of sample used in the process of the present invention is controlled to be approximately 10 milliliters, which is substantially smaller than the samples required in prior art techniques.

The second or extraction step of the present invention requires the use of a solvent which is added to the buffered urine specimen. The solvent essentially dissolves the morphine contained in the urine, extracting it from the urine specimen. The solvent used is comprised of three parts chloroform, one part isopropyl alcohol, by volume, along with a quantity of sodium sulfate, which is included with the buffer salts to act as an extraction aid.

Because of the choice of solvent, along with the inclusion of the sodium sulfate in the process of the present invention, the solvent may be sufficiently mixed with the buffered urine by mere, gentle inversion of the vial containing the mixture, approximately 20 times. In the prior art this mixing step requires violent agitation for at least two minutes.

The mixed sample is then filtered through phase separating paper, which permits passage of the solvent containing morphine first. Care must be taken to halt the collection process before the urine phase is allowed to pass through the filter. Because of the initially smaller sample chosen, a relatively smaller volume of solvent (approximately 2 milliliters) may be used in the process of the present invention.

The phase separating paper referred to above is a water repellent paper which acts as a phase separator. Such paper is a comparatively recent development which separates aqueous solutions from organic (water immiscible) solutions by retaining the aqueous layer while allowing the organic layer to pass through the paper. The use of phase separating paper is a critical and significant departure from the teaching of the prior art and has been found to be very effective for purposes of the procedure described herein. One suitable paper is manufactured in England by W. & R. Balston, Ltd., and is available in this country through Reeve Angel of 9 Bridewell Place, Clifton, N.J. 07014, under the name "Whatman Phase Separating Paper Silicon Treated 1–PS."

In the prior art, the solvent has been separated from the urine by centrifuge. This requirement arose from the fact that an emulsion formed as a result of the vigorous agitation suggested by the prior art as necessary for extraction.

The third or identification step used in the procedure of the present invention comprises adding the separated solvent containing morphine to an indicating solution comprised of approximately 7.5% ammonium molybdate in concentrated sulfuric acid. The use of this concentration of ammonium molybdate, which is higher than has been taught in the prior art, along with the use of a smaller quantity of indicator (approximately one-half milliliter), has yielded increased sensitivity of the test.

In fact, the differences in volume of indicator and in volume of solvent specified for the procedure described herein, over those of the prior art, which, in each case requires use of a substantially larger volume of material, are critical in providing the increased sensitivity yielded by use of the procedure described herein.

A kit, for practicing the process of the present invention to enable simple and rapid performance of the procedure described above, comprises the following:

(1) Specimen tube containing sodium borate, sodium carbonate, and sodium sulfate.
(2) Ampoule of solvent.
(3) Funnel with filter paper inserted therein.
(4) Vial containing indicator solution.

Using the kit, performance of the test, in accordance with the present invention, is accomplished as follows:

(1) Approximately 10 milliliters of urine are added to the contents of the specimen tube.
(2) The contents of the ampoule are added to the specimen tube.
(3) The mixture is gently inverted approximately 20 times.
(4) The contents of the specimen tube are poured into the funnel (with filter paper in place), allowing only the organic phase to pass through the phase separating paper into the vial containing the indicator solution. This merely requires preventing the passage of the urine phase by removing the funnel as soon as the solvent has passed through the filter.
(5) The presence of morphine is signalled by the immediate development of a pink color in the indicator vial after the vial is recapped and shaken.

There has thus been described a novel and improved procedure for the detection of morphine or other opium derivatives in urine. Although the chemistry of the process is well known, the specific reagents chosen, the use of the specified quantities of sample and reagents, the use of phase separating paper as well as the other novel features set forth above, have provided what is, in fact, a vastly improved technique enabling many user agencies to obtain results quickly and inexpensively. Performance of the process of the present invention yields accuracy sufficient for most of the purposes set forth above, and will make possible many other applications which have heretofore been impractical.

What is claimed is:

1. A method for the performance of the indicator-dye test for the rapid determination of the concentration of morphine in a urine sample, said method comprising the steps of:
   (a) adjusting the pH of the urine sample to a value within the range 8.5–9.5 pH units;
   (b) extracting the morphine from said adjusted urine sample by;
      (i) adding a relatively small volume of solvent to said adjusted urine sample, (ii) mixing said adjusted urine sample and said solvent by gently inverting said mixture a plurality of times, (iii) filtering said mixture through phase separating paper, collecting the solvent phase and terminating the filtration process before the passage of the urine phase;

(c) detecting and indicating the presence of morphine conjugates by adding said collected solvent phase to an indicating solution which changes color in the presence of morphine.

2. The method in accordance with claim 1, in which the pH adjustment step is performed by adding sodium borate and sodium carbonate to the urine sample; in which the solvent comprises a mixture of chloroform and isopropyl alcohol; and in which the indicating solution comprises a solution of ammonium molybdate in concentrated sulfuric acid.

3. The method in accordance with claim 2, in which the urine sample comprises approximately 10 milliliters, and, in performing said pH adjustment step, approximately 0.8 gram of sodium borate and 0.15 gram of sodium carbonate are added to the urine sample; in which approximately 2.0 milliliters of a solvent comprising a mixture of approximately 3 parts chloroform and 1 parts isopropyl alcohol, by volume, is used; and in which approximately 0.5 milliliter of an indicating solutuion comprising a solution of approximately 7.5% ammonium molybdate in concentrated sulfuric acid is used.

4. The method in accordance with claim 2, wherein the pH adjustment step is accompanied by the addition of an extraction aid to the urine sample, said extraction aid comprising sodium sulfate.

5. The method in accordance with claim 3, wherein the pH adjustment step is accompanied by the addition of an extraction aid to the urine sample, said extraction aid comprising 0.8 gram of sodium sulfate.

6. A method for the performance of the indicator-dye test for the rapid determination of the concentration of morphine in a urine sample, said method comprising the steps of:

(a) adjusting the pH of the urine sample to a value within the range 8.5–9.5 pH units;

(b) to a specimen tube containing sodium borate, sodium carbonate and sodium sulfate, adding the urine sample;

(c) to said specimen tube and its contents, adding a mixture of chloroform and isopropyl alcohol;

(d) mixing said contents of said specimen tube by gentle inversion a plurality of times;

(e) filtering said mixed contents of said specimen tube into a vial containing an indicator solution through a filter comprising phase separating paper in a funnel, allowing the passage of the solvent phase and preventing the passage of the urine phase by removing the funnel from said vial after the passage of said solvent phase, said indicator solution comprising a solution of ammonium molybdate in concentrated sulfuric acid; and (f) manually agitating said vial and its contents and observing and measuring any resulting color changes.

7. The method in accordance with claim 6 wherein the urine sample of step (a) comprises approximately 10 milliliters; wherein step (b) is carried out with approximately 0.8 gram of sodium borate, approximately 0.15 gram of sodium carbonate and approximately 0.8 gram of sodium sulfate; wherein step (c) is carried out with a mixture comprising approximately 3 parts chloroform and 1 part isopropyl alcohol; and wherein step (e) is carried out with an indicator comprising a solution of ammonium molybdate in concentrated sulfuric acid.

References Cited

UNITED STATES PATENTS

| | | | |
|---|---|---|---|
| 3,275,416 | 9/1966 | Zaar | 23—230 B |
| 3,625,652 | 12/1971 | Fujimoto | 23—230 B |
| 3,656,906 | 4/1972 | Bullock | 23—230 B |
| 3,630,957 | 12/1971 | Rey | 23—230 B C X |

OTHER REFERENCES

Chemical Abstracts 67: 105849v (1967).

William P. Butler, "Methods of Analysis," Internal Revenue Service, 61–64, 136, publication No. 341, 1967.

MORRIS O. WOLK, Primary Examiner

S. MARANTZ, Assistant Examiner

U.S. Cl. X.R.

210—23; 252—408